Nov. 27, 1962 H. B. SACHSE 3,065,532

METHOD OF MAKING METALLIC JOINTS

Filed April 22, 1958

INVENTOR.
Herbert B. Sachse.
BY William D. Carothers
HIS ATTORNEY.

United States Patent Office 3,065,532
Patented Nov. 27, 1962

3,065,532
METHOD OF MAKING METALLIC JOINTS

Herbert B. Sachse, % Keystone Carbon Co., St. Marys, Pa.

Filed Apr. 22, 1958, Ser. No. 731,577
6 Claims. (Cl. 29—470)

This application relates to a method of making metallic joints, particularly permanent and strong joints with good thermal and electrical conductivity between electrical conductors and bodies to which they are to be connected, or between refractory bodies such as carbon bodies and sintered oxide bodies, or between other conducting and nonconducting bodies. The conductors may be of metal of any suitable form. My invention is particularly useful for securing electrical leads to thermistors which comprise mixtures of metallic oxides.

This application is a continuation in part of my application, Serial No. 359,891, filed June 5, 1953, and now abandoned.

It is well known to make joints or electrical contacts on the aforementioned and other materials by spraying them with a metal to coat the same and subsequently soldering, welding, or otherwise connecting the joints. Such metal coatings are applied directly with metal spray guns or by painting and subsequent firing.

The thermal stability of a soldered contact is limited by the relatively low melting point of the solder metals. Furthermore, most of the solders contain tin, which has a strong tendency to alloy with copper, silver, gold, or platinum, which are the most suitable metals for fired metal coatings whether applied by spray or paint.

The fired coatings are normally very thin and, therefore, are easily dissolved by alloying to form compounds of tin. If silver is used for the fired coating, then the alloy will be $Ag_3Sn$, which does not adhere very well to a base. If some unalloyed coating metal such as copper, silver, gold, or platinum is left after soldering, the diffusion between tin and these metals continues at room temperature, which promotes a slow deterioration of the contact.

It is also known to make permanent joints or contacts between carbon bodies or oxide ceramic bodies and metallic parts in form of wires, cords, bands, or sheets by the so-called tamping process. In this process, the metal parts are placed in a hole or slot of the material. This hole or slot is subsequently filled under pressure with a metal powder, with or without binder. By heating the compressed metal powder, the metal parts become fixed. The thermal stability of this contact is limited by the chemical and physical stability of the tamping metal. However, this process requires high labor costs and potential material losses by breakage, because the necessary holes or slots have to be made by pressing or machining. Furthermore, metal powders with high dispersity are expensive and oxidize easily in storage, making them useless for this purpose.

The disadvantages of the soldering and the tamping process can be avoided by the following procedure of the present invention. The parts to be combined are brought into a loose mechanical contact, one touching the other. The mechanical joint is heated and covered or touched with a chemical compound which can be easily dissociated by heat into a metallic conducting element and a released gas that is preferably neither explosive nor poisonous; for example, oxygen, nitrogen, carbon dioxide.

By dissociation of such a compound, a highly active metal is produced in its mascent form which can be sintered at temperatures which are low in comparison to the sintering temperature of commercial metal or metal powders. This decomposition of the compound and the subsequent sintering of the mascently formed metal can be produced by heating the compound and the surfaces making up the joint, or all of the constituents, namely, the compound and the parts to be combined which include the surfaces making up the joint.

The joint produced by dissociation is of high tensile strength and its thermal stability is limited on a short time basis by the melting point and on a long term basis by the recrystallization temperature of the metal released by dissociation. There is not only cohesion within the sintered metal but also strong adhesion of the sintered metal to metal bodies and to carbon or to conductive or insulating oxide ceramics.

The dissociation of a metal compound delivers a nascent metal which is extremely active, having a high surface affinity. The activity of the nascent metal is much higher than could be obtained with any metal powders, since, under the same conditions, the metal powders would not knit together or knit with a surface.

After the nascent metal is released, it is fritted or sintered by the temperature to which the two bodies to be joined have been heated to form a brazed contact consisting of the sintered metal. That part of the compound which has not been decomposed by the heat will not be fritted and will be loose and can therefore be easily removed.

The dissociable compounds which are used in carrying out my invention have certain characteristics. The compounds must produce directly upon dissociation a pure nascent metal. They must be solid at room temperature and at the temperatures at which they dissociate. At the temperature to which they are heated, they must produce a dissociation pressure greater than one atmosphere. They must not be volatile at the temperatures to which they are heated and they must be stable in the atmosphere in which the joining operation is conducted. There are a number of known compounds which possess these characteristics and which therefore, can be used as the dissociable compound in carrying out my invention. A few examples are oxides of silver, gold, palladium, ruthenium, platinum, and iridium. Solid azides and carbonyls may also be used, although they may create difficulties due to the unstable nature of azides and the poisonous reaction produced from the carbonyls.

In carrying out my invention, it is desirable to have the action proceed as rapidly as possible and, therefore, the two bodies to be joined should be heated to a temperature as high as possible but short of the melting point of the metal forming part of the dissociable compound, subject, however, to certain other considerations. That is, the two bodies should not be raised to such a temperature that either one of the two bodies being joined or the joint itself recrystallizes. Likewise, the temperature should not be so high as to produce a reaction between the joint and one of the bodies, nor should there be any diffusion of the metal of the joint into one of the bodies and, likewise, there should be no change in properties of one of the bodies due to the temperature to which it is heated. I have found that a suitable temperature range for carrying out my invention is one half of the melting temperature of the metal of the dissociable compound in degrees Kelvin up to a temperature approximating but below the melting point of that metal, the upper temperature limit being subject to the considerations just mentioned. The following are examples of minimum temperatures for the metals referred to above:

| | °K. |
|---|---|
| Silver | 617 |
| Gold | 668 |
| Palladium | 914 |
| Ruthenium | 1112 |
| Platinum | 1023 |

| | |
|---|---|
| Iridium | 1363 |
| Rhodium | 1120 |

For many applications, recrystallization of the joint can be avoided by taking advantage of the well-known delay of recrystallization of alloys, as compared to pure metals. Accordingly, a mixture of two or more dissociable metal compounds is used. The mixture is heated to a temperature at least as high as one half of the melting point in degrees Kelvin of the metal in the mixture having the lowest melting point. When this mixture dissociates, the result is a joint made of an alloy of the several metals used in the dissociable compound. The specific proportions of the compounds from which the alloy is to be made should be suited for the particular purpose to which it is applied, and the proportions may be selected between the ranges of from 5% to 95% of the different metal compounds, 5% being the lowest percentage of any one or more of the constituents and the maximum percentage of any one or more of the constitutents ranging from 95% to a lower percentage which completes the full proportion.

Other objects and advantages appear hereinafter in the following description and claims.

The accompanying drawing shows for the purpose of exemplification without limiting the invention or claims thereto certain practical embodiments illustrating the principles of the invention, wherein:

Figures 1, 2, 3:
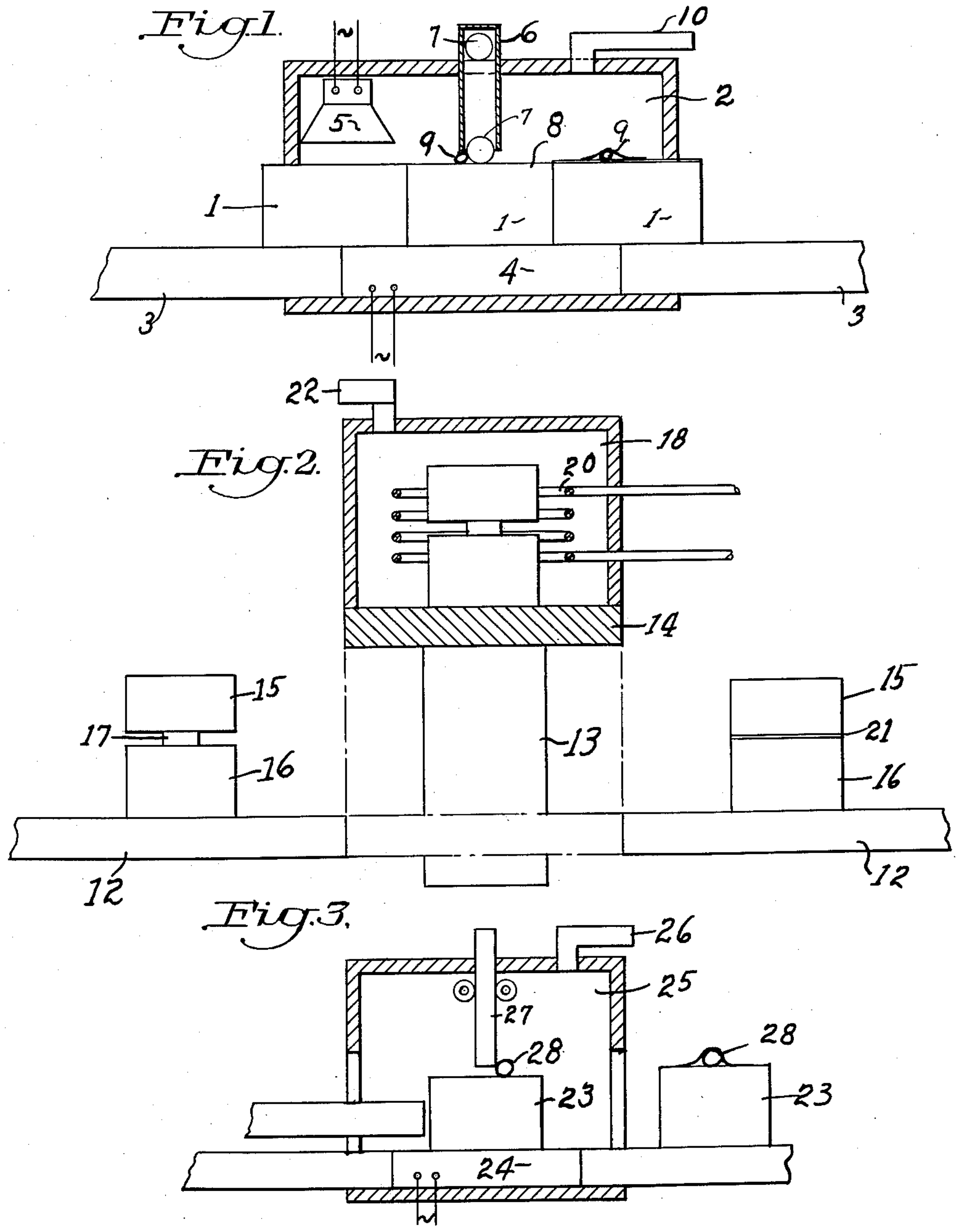
FIGURE 1 is a schematic view illustrating the application of a dissociable metal compound applied in the form of a pellet to produce a contact or joint with an electrical terminal on a body heated from a hot plate.
FIGURE 2 is a view similar to FIGURE 1 showing the pellet between two bodies and heated by a high frequency furnace to produce a joint therebetween.
FIGURE 3 is a schematic view illustrating the application of a dissociable metal compound forming a joint with an electrical terminal wherein the dissociable metal is in the form of a rod fed automatically.

Referring to FIGURE 1 of the drawings, a series of bodies 1, each of which is to have applied thereto a joint with a conductor, also referred to in the claims as a body, are fed through the chamber 2 on the conveyor 3. The central part of the conveyor is provided with a heater such as the electrical heater element 4. A primary heater 5 is suspended from the top of the chamber 2 for heating the surfaces of the bodies 1 as they approach the heater 4 to speed up the reaction during the forming of the joint. At the time the bodies arrive at the heater 4 in the chamber 2, the surface of the body 1 is sufficiently heated to the proper temperature. The feeder 6 is then caused to deliver a pellet of the metal compound onto the surface 8 where it becomes dissociated and the sintered metal covers the conductor or body 9 and the surface 8, forming the joint between these bodies. The released gases from the dissociation of the metal compound are drawn off through the passage 10. If the pellet does not become dissociated, the guide will not let the pellet remain on the surface 8 as the bodies are moved from under the feeder 6. A subsequent check by observation of the joint determines whether or not the pellet was dissociated.

In FIGURE 2, the operation of the conveyor 12 is interrupted by the lift elevator 13 having a platform 14 to receive the stacked bodies 15 and 16 with the pellet 17 mounted therebetween. This assembly of bodies is raised until the bodies 15 and 16 are reposed within the high frequency furnace 20 which heats the bodies 15 and 16 and the pellet causing dissociation of the same to produce a fixed joint 21 of fritted metal between the bodies 15 and 16. The chamber 18 is exhausted of the gases resulting from the dissociation through the passage 22. After the bodies are joined, the elevator 13 is lowered and they move forwardly along the conveyor 12 as indicated.

In FIGURE 3, the body 23, or its surface, is heated by the heater 24 when in the chamber 25 to that temperature at which dissociation of the metal compound will occur at a pressure of one or more atmospheres. By merely touching the rod 27, which is composed of the metal compound, to the heated surface of the body, the metal compound at the end of the rod 27 undergoes dissociation and produces the joint with the conductor body 28 forming the joint between these two bodies. This rod 27 may be intermittently and automatically fed to touch the heated surface of each body passing through the chamber. One merely need only touch the rod to the hot surface of the body to produce dissociation and produce the joint between the body and the conductor body.

While I have described certain presently preferred embodiments of my invention, it is to be understood that it may be otherwise embodied within the scope of the appended claims.

I claim:

1. The method of forming a metallic joint between two bodies, each of which is stable physically and chemically at the temperature at which the joint is formed, said method comprising placing the two bodies to be joined in contact with each other, placing against at least one of said bodies a pellet consisting of a metal compound which dissociates on being heated to produce a nascent metal in such position relative to said bodies that the nascent metal produced on dissociation of said compound will engage said bodies adjacent their point of contact, and heating the contacting surfaces of said bodies and the dissociable compound, the temperature to which said surfaces are heated being at least one half of the melting point in degrees Kelvin of the metal forming part of the dissociable compound but less than said melting point and sufficiently high that said compound produces on dissociation a dissociation pressure greater than one atmosphere, said compound forming on dissociation a nascent metal of the group consisting of silver, gold, palladium, ruthenium, platinum, iridium, and rhodium and a gas of the group consisting of oxygen, nitrogen, and carbon dioxide.

2. The method of forming a metallic joint between two bodies, each of which is stable physically and chemically at the temperature at which the joint is formed, said method comprising placing the two bodies to be joined in contact with each other, heating the contacting surfaces of the bodies, and placing against the bodies adjacent their point of contact a pellet consisting of a metal compound which dissociates on being heated to produce a nascent metal, the temperature to which said surfaces are heated being at least one half of the melting point in degrees Kelvin of the metal forming part of the dissociable compound but less than said melting point and sufficiently high that said compound produces on dissociation a dissociation pressure greater than one atmosphere, said compound forming on dissociation a nascent metal of the group consisting of silver, gold, palladium, ruthenium, platinum, iridium, and rhodium and a gas of the group consisting of oxygen, nitrogen, and carbon dioxide.

3. The method of forming a metallic joint between two bodies, each of which is stable physically and chemically at the temperature at which the joint is formed, said method comprising placing the two bodies to be joined in contact with each other, heating the contacting surfaces of the bodies, and placing against the bodies adjacent their point of contact a pellet consisting of a mixture of a plurality of metal compounds which dissociate on being heated to produce a nascent metal alloy, the temperature to which said surfaces are heated being at least one half of the melting point in degrees Kelvin of the metal forming part of said mixture having the lowest melting point but less than said melting point and sufficiently high that said compound produces on dissociation a dissociation pressure greater than one atmosphere, said compound forming on dissociation nascent metals of the group consisting of silver, gold, palladium, ruthenium, platinum, iridium, and rhodium and a gas of the group consisting of oxygen, nitrogen, and carbon dioxide.

4. The method of forming a metallic joint between an electrically conductive metal body and a solid body containing at least one metal oxide, said method comprising placing the two bodies to be joined in contact with each other, heating the contacting surfaces of the bodies, and placing against the bodies adjacent their point of contact a pellet consisting of a metal compound which dissociates on being heated to produce a nascent metal, the temperature to which said surfaces are heated being at least one half of the melting point in degrees Kelvin of the metal forming part of the dissociable compound but less than said melting point and sufficiently high that said compound produces on dissociation a dissociation pressure greater than one atmosphere, said compound forming on dissociation a nascent metal of the group consisting of silver, gold, palladium, ruthenium, platinum, iridium, and rhodium and a gas of the group consisting of oxygen, nitrogen, and carbon dioxide.

5. The method of forming a metallic joint between two bodies, each of which is stable physically and chemically at the temperature at which the joint is formed, said method comprising placing the two bodies to be joined in contact with each other, placing a pellet consisting of a metal compound which dissociates on being heated to produce a nascent metal in such position relative to said bodies that the nascent metal produced on dissociation of said compound will engage said bodies adjacent their point of contact, and heating the contacting surfaces of said bodies and the dissociable compound, the temperature to which said surfaces are heated being at least one half of the melting point in degrees Kelvin of the metal forming part of the dissociable compound but less than said melting point and sufficiently high that said compound produces on dissociation a dissociation pressure greater than one atmosphere, said compound being an oxide of a metal of the group consisting of silver, gold, palladium, ruthenium, platinum, iridium, and rhodium.

6. The method of forming a metallic joint between two bodies, each of which is stable physically and chemically at the temperature at which the joint is formed, said method comprising placing the two bodies to be joined in contact with each other, placing a pellet consisting of silver oxide which dissociates on being heated to produce nascent silver in such position relative to said bodies that the nascent silver produced on dissociation will engage said bodies adjacent their point of contact, and heating the contacting surfaces of said bodies and the silver oxide to a temperature which is at least one half of the melting point in degrees Kelvin of silver but less than said melting point and sufficiently high that said compound produces on dissociation a dissociation pressure greater than one atmosphere.

References Cited in the file of this patent

UNITED STATES PATENTS

| | | |
|---|---|---|
| 227,118 | Man | May 4, 1880 |
| 553,296 | Aylsworth | Jan. 21, 1896 |
| 575,668 | Lodyguine | Jan. 19, 1897 |
| 986,558 | Farkas | Mar. 14, 1911 |
| 1,048,128 | Bazner | Dec. 24, 1912 |
| 1,189,194 | Eldred | June 27, 1916 |
| 2,219,365 | Jensen | Oct. 29, 1940 |
| 2,226,720 | Hansell | Dec. 31, 1940 |
| 2,401,362 | McCain | June 4, 1946 |
| 2,418,461 | Becker et al. | Apr. 8, 1947 |
| 2,454,270 | Braunsdorff | Nov. 23, 1948 |
| 2,487,001 | Taylor et al. | Nov. 1, 1949 |
| 2,645,006 | Hadley | July 14, 1953 |
| 2,686,958 | Eber et al. | Aug. 24, 1954 |
| 2,788,432 | Moles | Apr. 9, 1957 |
| 2,807,082 | Zambrow et al | Sept. 24, 1957 |